(12) United States Patent
Tasaki et al.

(10) Patent No.: US 7,733,629 B2
(45) Date of Patent: *Jun. 8, 2010

(54) LITHIUM ION CAPACITOR

(75) Inventors: Shinichi Tasaki, Shinjuku-ku (JP);
Nobuo Ando, Shinjuku-ku (JP);
Mitsuru Nagai, Shinjuku-ku (JP);
Atsuro Shirakami, Shinjuku-ku (JP);
Kohei Matsui, Shinjuku-ku (JP);
Yukinori Hato, Shinjuku-ku (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1015 days.

This patent is subject to a terminal disclaimer.

(21) Appl. No.: 10/584,858

(22) PCT Filed: Oct. 19, 2005

(86) PCT No.: PCT/JP2005/019239

§ 371 (c)(1),
(2), (4) Date: Jun. 28, 2006

(87) PCT Pub. No.: WO2006/112068

PCT Pub. Date: Oct. 26, 2006

(65) Prior Publication Data

US 2009/0154064 A1    Jun. 18, 2009

(30) Foreign Application Priority Data

Mar. 31, 2005    (JP)    ............................. 2005-104691

(51) Int. Cl.
*H01G 9/00*    (2006.01)

(52) U.S. Cl. ........................ 361/502; 361/503; 361/504; 361/508; 361/512; 361/523

(58) Field of Classification Search ................. 361/502, 361/503–504, 508–512, 523–529, 516–519; 429/212, 233

See application file for complete search history.

(56) References Cited

U.S. PATENT DOCUMENTS 6,043,975 A * 3/2000 Kanbara et al. ............. 361/502

(Continued)

FOREIGN PATENT DOCUMENTS

JP    8 107048    4/1996

(Continued)

OTHER PUBLICATIONS

U.S. Appl. No. 10/576,363, filed Apr. 19, 2006, Matsui et al.

(Continued)

*Primary Examiner*—Nguyen T Ha
(74) *Attorney, Agent, or Firm*—Oblon, Spivak, McClelland, Maier & Neustadt, L.L.P.

(57) ABSTRACT

A lithium ion capacitor including a positive electrode, a negative electrode, and an aprotic organic solvent solution of a lithium salt as an electrolytic solution. The positive electrode active material is capable of reversibly supporting lithium ions and/or anions, the negative electrode active material is capable of reversibly supporting lithium ions and anions, and the potentials of the positive electrode and the negative electrode are at most 2.0 V after the positive electrode and the negative electrode are short-circuited. The positive electrode and the negative electrode are alternately laminated with a separator interposed therebetween to constitute an electrode unit, the cell is constituted by at least two such electrode units, lithium metal is disposed between the electrode units, and lithium ions are preliminarily supported by the negative electrode and/or the positive electrode by electrochemical contact of the lithium metal with the negative electrode and/or the positive electrode.

9 Claims, 4 Drawing Sheets

U.S. PATENT DOCUMENTS

| | | | |
|---|---|---|---|
| 6,097,587 A * | 8/2000 | Inagawa et al. | 361/502 |
| 6,461,769 B1 | 10/2002 | Ando et al. | |
| 6,765,785 B2 * | 7/2004 | Honda et al. | 361/525 |
| 6,862,168 B2 | 3/2005 | Ando et al. | |
| 2009/0027831 A1 * | 1/2009 | Tasaki et al. | 361/523 |

FOREIGN PATENT DOCUMENTS

| | | |
|---|---|---|
| JP | 11-260673 | 9/1999 |
| JP | 11 297578 | 10/1999 |
| JP | 2003-217986 | 7/2003 |
| WO | 98 33227 | 7/1998 |
| WO | 03 003395 | 1/2003 |

OTHER PUBLICATIONS

U.S. Appl. No. 10/576,489, filed Apr. 20, 2006, Tasaki et al.

* cited by examiner

LITHIUM ION CAPACITOR

TECHNICAL FIELD

The present invention relates to a lithium ion capacitor having a high energy density, a high power density and a large capacity.

BACKGROUND ART

In recent years, a battery using as a negative electrode a carbon material such as graphite and using as a positive electrode a lithium-containing metal oxide such as $LiCoO_2$, has been proposed. This battery is a so-called rocking chair battery such that after it is assembled, lithium ions are supplied from the lithium-containing metal oxide as the positive electrode to the negative electrode by charge, and lithium ions are returned from the negative electrode to the positive electrode by discharge. This battery is called a lithium ion secondary battery since no lithium metal is used for the negative electrode but only lithium ions are involved in the charge and discharge, and this battery is distinguished from a lithium battery using lithium metal. This battery is characterized by having a high voltage, a large capacity and high safety.

Further, as concern for environmental problems is increasing, storage system for clean energy by solar power generation or wind power generation, and power sources for electric automobiles and hybrid electric automobiles which replace gasoline-fueled automobiles, have been actively developed. Further, along with the tendency of on-vehicle apparatus and equipment such as power windows and IT devices to high quality and high functionality in recent years, a new power source has been required in view of the energy density and the output density.

As a storage device to be used for such an application which requires a high energy density and high power characteristics, in recent years, attention has been paid to a storage device called a hybrid capacitor comprising a combining storage principles of a lithium ion secondary battery and an electric double layer capacitor. As one example, an organic electrolyte capacitor has been proposed (for example, Patent Document 1) in which as a negative electrode, a carbonaceous material capable of absorbing-desorbing lithium ions and increasing drastically energy density by preliminary absorbing and supporting lithium ions (hereinafter sometimes referred to as doping) by a chemical or electrochemical method to lower the negative electrode potential, is used.

Such an organic electrolyte capacitor is expected to have high performance, but has drawbacks such that when the negative electrode is preliminarily doped with lithium ions, the doping requires a very long time, and it tends to be difficult to make lithium ions be uniformly supported by the entire negative electrode. Particularly, a large-size large capacity cell such as a cylindrical apparatus having electrodes wound or a rectangular battery having a plurality of electrodes laminated, has been considered to be hardly used practically.

To solve such problems, an organic electrolyte battery has been proposed (for example, Patent Document 2), wherein each of a positive electrode current collector and a negative electrode current collector has pores penetrating from the front surface to the back surface, a negative electrode active material is capable of reversibly supporting lithium ions, and lithium ions are supported by the negative electrode by electrochemical contact with a lithium metal disposed to face the negative electrode or the positive electrode.

In the organic electrolyte battery in which the electrode current collector has pores penetrating from the front surface to the back surface, lithium ions can move from the front surface to the back surface of the electrode without being blocked by the electrode current collector. Thus, even in a storage device having a cell structure with a number of electrodes laminated, it is possible to make lithium ions be electrochemically supported by not only a negative electrode disposed in the vicinity of lithium metal but also a negative electrode disposed distant from lithium metal, via the through-pores.

Patent Document 1: JP-A-8-107048
Patent Document 2: WO98/033227

DISCLOSURE OF THE INVENTION

Problems that the Invention is to Solve

As described above, with respect to a negative electrode made of e.g. a carbonaceous material capable of absorbing-desorbing lithium ions and preliminarily absorbed lithium ions, the potential of such a negative electrode is lower than that of an activated carbon to be used for an electric double layer capacitor, and thus the withstand voltage of a cell using such a negative electrode in combination with an activated carbon for the positive electrode tends to improve. Further, since the capacity of the negative electrode is very large as compared with that of an activated carbon, an organic electrolyte capacitor (lithium ion capacitor) having the above negative electrode will have a high energy density.

In the above lithium ion capacitor, the cell is constituted as an electrode laminated body having positive electrodes and negative electrodes alternately laminated with a separator interposed therebetween, and the negative electrodes are sequentially doped with lithium ions from lithium metal disposed at the outside of the electrode laminated body via through pores on the electrode current collector plates. Accordingly, the larger the number of laminated electrodes constituting the cell is, the longer the time required to preliminarily dope the negative electrodes with lithium ions becomes. In a case where 10 to 20 electrodes are laminated for example, the negative electrodes can be doped with lithium ions in a predetermined amount over a not so long period by disposing one or two sheets of lithium metal at the outermost portion of the electrode laminate, i.e. by disposing a lithium metal on the upper portion, on the lower portion or on the upper and lower portions of the electrode laminate body laminated in a horizontal direction for example. However, if the number of electrodes laminated is larger than the above, doping with lithium ions will take long (at least 30 days for example) even under optimum conditions, which is industrially disadvantageous.

Namely, in a conventional lithium ion capacitor, because a cell has a structure in which the negative electrodes are doped with lithium ions from lithium metal disposed on the upper portion, on the lower portion or on the upper and lower portions of the electrode laminate, it is substantially difficult to increase the number of lithium metal to be disposed. Accordingly, if the number of electrodes laminated is increased in such a conventional lithium ion capacitor, doping with lithium ion take long as mentioned above, and if it is attempted to shorten the doping time, the number of electrodes to be laminated has to be reduced. As a result, it has been difficult to realize a storage device which can be used for applications for which a high energy density, a large capacity and high power characteristics are required, such as power sources for electric cars and electrical equipment of automobiles.

It has been proposed to dispose a lithium metal between electrodes in the process of lamination when positive electrodes and negative electrodes are laminated to constitute a cell, but such makes cell assembling operation be complicated and thereby reduces productivity, and such is unsatisfactory.

It is an object of the present invention to provide a lithium ion capacitor, wherein a positive electrode and a negative electrode are alternately laminated with a separator interposed therebetween to preliminarily constitute an electrode unit, the cell is constituted by at least two such electrode units, and lithium metal is disposed between the electrode units, whereby a lithium ion capacitor can be easily produced and has a large capacity and a high withstand voltage.

Means of Solving the Problems

To achieve the above object, the present inventors have conducted extensive studies on doping of the negative electrode with lithium ions and as a result, found that when a positive electrode and a negative electrode are alternately laminated with a separator interposed therebetween to preliminarily constitute an electrode unit and a cell is constituted by at least two such electrode units, by disposing lithium metal between the electrode units, the cell will easily be assembled and at the same time, the negative electrode can be doped with lithium ions evenly in a time as short as possible, and accomplished the present invention. Namely, the present invention provides the following.

(1) A lithium ion capacitor comprising a positive electrode, a negative electrode and an aprotic organic solvent solution of a lithium salt as an electrolytic solution, wherein a positive electrode active material is a material capable of reversibly supporting lithium ions and/or anions, a negative electrode active material is a material capable of reversibly supporting lithium ions, and the potentials of the positive electrode and the negative electrode are at most 2.0 V after the positive electrode and the negative electrode are short-circuited, characterized in that each of a positive electrode current collector and a negative electrode current collector has pores penetrating from the front surface to the back surface, the positive electrode and the negative electrode are alternately laminated with a separator interposed therebetween to constitute an electrode unit, the cell is constituted by at least two such electrode units, a lithium ion supply source is disposed between the electrode units, and lithium ions are preliminarily supported by the negative electrode and/or the positive electrode by electrochemical contact of the lithium ion supply source with the negative electrode and/or the positive electrode.

(2) The lithium ion capacitor according to the above (1), wherein a lithium ion supply source is further provided on the outside of one or both of the electrode units at the end of the cell.

(3) The lithium ion capacitor according to the above (1) or (2), wherein the lithium ion supply source is formed on a current collector and the current collector has pores penetrating from the front surface to the back surface.

(4) The lithium ion capacitor according to the above (1), (2) or (3), wherein the lithium ion supply source is formed in such a manner that lithium ion metal is pressure bonded on one side or both sides of the current collector.

(5) The lithium ion capacitor according to any one of the above (1) to (4), wherein the outermost portion of the electrode unit is a separator, and the inside thereof is the negative electrode.

(6) The lithium ion capacitor according to any one of the above (1) to (5), wherein the positive electrode active material is any one of (a) an activated carbon, (b) an electrically conductive polymer and (c) a polyacenic organic semiconductor (PAS) which is a heat-treated aromatic condensed polymer having a polyacenic skeleton structure with an atomic ratio of hydrogen atoms/carbon atoms between 0.50 and 0.05.

(7) The lithium ion capacitor according to any one of the above (1) to (6), wherein the negative electrode active material is any one of (a) graphite, (b) hardly graphitizable carbon and (c) a polyacenic organic semiconductor (PAS) which is a heat-treated aromatic condensed polymer having a polyacenic skeleton structure with an atomic ratio of hydrogen atoms/carbon atoms between 0.50 and 0.05.

(8) The lithium ion capacitor according to any one of the above (1) to (7), wherein the outside of the electrode units is fixed with a tape.

(9) The lithium ion capacitor according to any one of the above (1) to (8), wherein the negative electrode active material has a capacitance per unit weight at least three times that of the positive electrode active material, and the weight of the positive electrode active material is larger than the weight of the negative electrode active material.

Effects of the Invention

In the lithium ion capacitor of the present invention, the positive electrode potential and the negative electrode potential are at most 2.0 V after the positive electrode and the negative electrode are short-circuited, each of the positive electrode current collector and the negative electrode current collector has pores penetrating from the front surface to the back surface, a lithium ion supply source is disposed between electrode units each having a positive electrode and a negative electrode alternately laminated with a separator interposed therebetween, and lithium ions are preliminarily supported by the negative electrode and/or the positive electrode by electrochemical contact of the lithium ion supply source with the negative electrode and/or the positive electrode. Accordingly, by charging of this cell, the negative electrode will have a lowered potential and an increased capacitance, and the number of electrodes constituting the cell will easily be increased. Thus, a large-size storage device having a high energy density, a high output density and a large capacity will be obtained. Accordingly, it becomes possible to realize a storage device which can be used for applications for which a large capacity and high output characteristics are required, such as power sources for electric automobiles and for electrical equipment of automobiles.

Further, by disposing a lithium ion supply source for supporting the negative electrode and/or the positive electrode between the electrode units, the degree of freedom of the cell design and mass productivity will improve and excellent charge and discharge characteristics will be obtained.

Further, as a cell structure of disposing a lithium ion supply source between electrode units is employed, the number of electrodes laminated to be doped by one layer of the lithium ion supply source can be reduced, and the negative electrode and/or the positive electrode can be doped with lithium ions evenly in a short time, whereby a high quality lithium ion capacitor can be efficiently produced.

Further, the cell can be formed by assembling at least two electrode units each having a positive electrode and a negative electrode alternately laminated with a separator interposed therebetween, and thus workability in cell assembling can be improved.

EXPLANATION OF SYMBOLS

Figure 1:
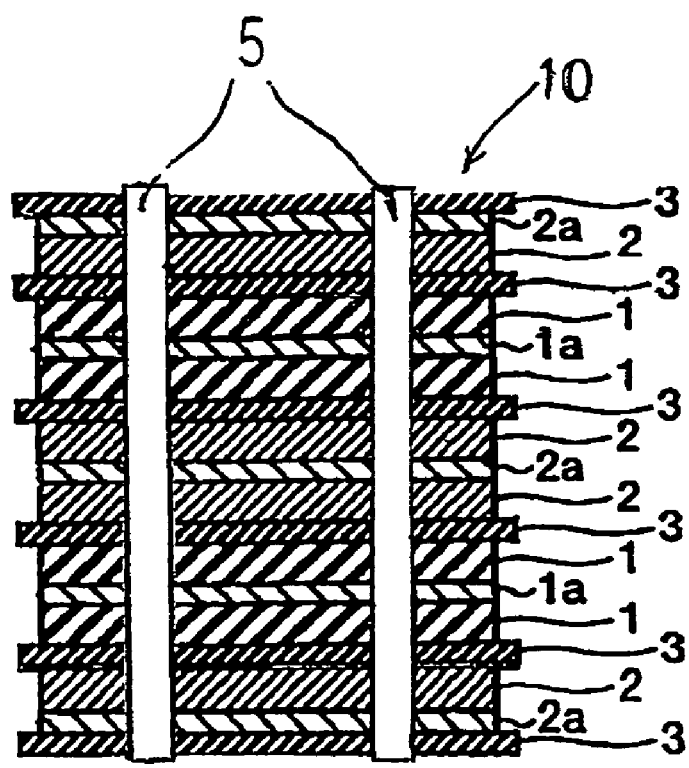
FIG. 1 is a front view illustrating a preferred electrode unit constituting a lithium ion capacitor of the present invention.

1: Positive electrode, 1a: positive electrode current collector, 2: negative electrode, 2a: negative electrode current collector, 3: separator, 4: lithium metal, 4a: lithium electrode current collector, 5: tape, 6: outer container, 7: positive electrode terminal, 8: negative electrode terminal, 9: lead-out portion, 10: electrode unit, 11: pore

BEST MODE FOR CARRYING OUT THE INVENTION

The lithium ion capacitor (hereinafter sometimes referred to as LIC) of the present invention comprises a positive electrode, a negative electrode and an aprotic organic electrolytic solution of a lithium salt as an electrolytic solution, wherein a positive electrode active material is a material capable of reversibly supporting lithium ions and/or anions, a negative electrode active material is a material capable of reversibly supporting lithium ions, and the potential of the positive electrode is at most 2.0 V ($Li/Li^+$, the same applies hereinafter) after the positive electrode and the negative electrode are short-circuited.

In a conventional electric double layer capacitor, usually the same active material (mainly an activated carbon) is used for the positive electrode and the negative electrode in substantially the same amounts. This active material has a potential of about 3 V when a cell is assembled, and when the capacitor is charged, anions form an electric double layer at the surface of the positive electrode thereby to increase the positive electrode potential, and on the other hand, cations form an electric double layer at the surface of the negative electrode thereby to decrease the potential. On the contrary, upon discharging, anions and cations, respectively from the positive electrode and the negative electrode, are released to the electrolytic solution, and the potentials respectively decreases and increases thereby to recover to about 3 V. As mentioned above, as a common carbonaceous material has a potential of about 3.0 V, in an organic electrolyte capacitor using a carbonaceous material for both the positive electrode and the negative electrode, potentials of the positive electrode and the negative electrode are both about 3 V after the positive electrode and the negative electrode are short-circuited.

On the other hand, in LIC of the present invention, potentials of the positive electrode and the negative electrode after the positive electrode and the negative electrode are short-circuited are at most 2.0 V as mentioned above. That is, in the present invention, an active material capable of reversibly supporting lithium ions and/or anions is used for the positive electrode, an active material capable of reversibly supporting lithium ions is used for the negative electrode, and lithium ions are preliminarily made to be supported by the negative electrode and/or the positive electrode so that the potentials of the positive electrode and the negative electrode are at most 2.0 V after the positive electrode and the negative electrode are short-circuited.

In the present invention, the potential of the positive electrode being at most 2V after the positive electrode and the negative electrode are short-circuited, means a potential of the positive electrode of at most 2 V as measured by either of the following two methods (A) and (B). That is, (A) after doping with lithium ions, a positive electrode terminal and a negative electrode terminal of a capacitor cell are directly connected by a conducting wire and the capacitor is left to stand for at least 12 hours in such a state, and then the short circuit is released, and the positive electrode potential is measured within 0.5 to 1.5 hours, (B) after discharging to 0 V at a constant current over a period of at least 12 hours by a charge and discharge testing apparatus, a positive electrode terminal and a negative electrode terminal are connected by a conducting wire and the capacitor is left to stand for at least 12 hours in such a state, and then the short circuit is released, and the positive electrode potential is measured within 0.5 to 1.5 hours.

Further, in the present invention, the positive electrode potential being at most 2.0 V after the positive electrode and the negative electrode are short-circuited is not limited only to the potential immediately after doping with lithium ions, but means a positive electrode potential of at most 2.0 V after short circuit in any state, i.e. short circuit in a charged state, in a discharged state or after repeated charge and discharge.

In the present invention, the positive electrode potential being at most 2.0 V after the positive electrode and the negative electrode are short-circuited, will be described in detail below. As described above, an activated carbon and a carbon material usually have a potential at a level of 3 V ($Li/Li^+$). In a case where an activated carbon is used for both the positive electrode and the negative electrode to assemble a cell, since both potentials are about 3 V, the positive electrode potential will be unchanged and about 3 V even when the electrodes are short-circuited. Further, also in the case of a hybrid capacitor using an activated carbon for the positive electrode and using for the negative electrode a carbon material such as graphite or hardly graphitizable carbon to be used for a lithium ion secondary battery, since both the potentials are about 3 V, the positive electrode potential will be unchanged and about 3 V even when the electrodes are short-circuited. The negative electrode potential will move to the vicinity of 0 V by charge although it depends on the balance of positive electrode and negative electrode weights, and it is thereby possible to increase the charge voltage, whereby a capacitor having a high voltage and a high energy density will be obtained. In general, the upper limit of the charge voltage is determined to be a voltage at which no decomposition of the electrolytic solution by an increase of the positive electrode potential will occur. Thus, when the positive electrode potential is at the upper limit, it is possible to increase the charge voltage correspondingly to a decrease of the negative electrode potential. However, in the above-described hybrid capacitor of which the positive electrode potential is about 3 V at the time of short circuit, if the upper limit potential of the positive electrode is 4.0 V for example, the positive electrode potential upon discharging is limited to 3.0 V, and the change in potential of the positive electrode is at a level of 1.0 V and the capacity of the positive electrode can not sufficiently be utilized. Further, it has been known that when lithium ions are inserted into (charge) and released from (discharge) the negative electrode, the initial charge and discharge efficiency is low in many cases, and some lithium ions can not be released upon discharging. This is explained to be because the lithium ions are consumed for decomposition of the electrolytic solution at the surface of the negative electrode or they are trapped in structural defective portions of the carbon material. In such a case, the charge and discharge efficiency of the negative electrode tends to be low as compared with the charge and discharge efficiency of the positive electrode, the positive electrode potential will be higher than 3 V when the cell is short-circuited after charge and discharge are repeatedly carried out, and the utilized capacity will further decrease. That is, if the positive electrode is discharged only from 4.0 V to 3.0 V even if it is supposed to be discharged from 4.0 V to 2.0 V, only half the capacity is utilized, and the capacitor can not have a large capacity although it may have a high voltage.

In order to achieve not only a high voltage and a high energy density but also a large capacity and further a high energy density of a hybrid capacitor, it is required to improve the utilized capacity of the positive electrode. That is, when the positive electrode potential after the short circuit is lower than 3.0 V, the utilized capacity will increase correspondingly, and a large capacity will be achieved. In order that the positive electrode potential will be at most 2.0 V, it is preferred to charge the negative electrode with lithium ions not only in an amount of lithium ions to be supplied by the charge and discharge of the cell but also separately from a lithium ion supply source such as lithium metal. As the lithium ions are supplied other than from the positive electrode and the negative electrode, the potential of the positive electrode, the negative electrode and lithium metal are in equilibrium and at most 3.0 V at the time of short circuit. The larger the amount of lithium metal is, the lower the equilibrium potential becomes. As the equilibrium potential changes depending upon the negative electrode material and the positive electrode material, it is required to adjust the amount of lithium ions to be supported by the negative electrode considering characteristics of the negative electrode material and the positive electrode material so that the positive electrode potential after short circuit will be at most 2.0 V.

With respect to the lithium ion capacitor of the present invention, the positive electrode potential being at most 2.0 V after the positive electrode and the negative electrode are short-circuited means that a positive electrode potential is at most 2.0 V after the cell is left to stand for a long time in a state where the positive electrode and the negative electrode are short-circuited, and is defined by the following measuring methods. Namely, it is judged that the positive electrode potential is at most 2.0 V after the positive electrode and the negative electrode are short-circuited, when the positive electrode potential is at most 2.0 V, which is measured by a method wherein a positive electrode terminal and a negative electrode terminal are directly connected by a conducting wire and the cell is left to stand for at least 12 hours in a such state, and then the short circuit is released, and the positive electrode potential is measured within 0.5 and 1.5 hours, or a method wherein after discharging to 0 V at a constant current over a period of at least 12 hours by a charge and discharge testing apparatus, a positive electrode terminal and a negative electrode terminal are connected by a conducting wire and the cell is left to stand for at least 12 hours in such a state, and then the short circuit is released, and the positive electrode potential is measured within 0.5 and 1.5 hours.

In LIC of the present invention, the positive electrode potential being at most 2.0 V after the positive electrode and the negative electrode are short-circuited, means that lithium ions are supplied to the positive electrode and/or the negative electrode other than from the positive electrode and the negative electrode of the LIC as mentioned above. The lithium ions may be supplied to one of or both the negative electrode and the positive electrode. However, in a case where an activated carbon is used for the positive electrode for example, if the amount of lithium ions supported is large and the positive electrode potential is low, lithium ions may be irreversibly consumed, and drawbacks such as a decrease in the capacity of the cell may occur in some cases. Thus, it is required to suitably control the amount of lithium ions to be supplied to the negative electrode and the positive electrode so that there will be no drawbacks.

Further, in a case where the positive electrode potential is higher than 2.0 V after the positive electrode and the negative electrode are short-circuited, as the amount of lithium ions supplied to the positive electrode and/or the negative electrode is small, the energy density of the cell tends to be low. The larger the amount of lithium ions supplied is, the lower the positive electrode potential becomes after the positive electrode and the negative electrode are short-circuited and the more the energy density will be improved. In order to obtain a high energy density, at most 2.0 V is preferred, and in order to obtain a further higher energy density, at most 1.0 V (Li/Li$^+$) is preferred. If the positive electrode potential is lower than 1.0 V, drawbacks such as evolution of gas or irreversible consumption of lithium ions may occur depending upon the positive electrode active material, and it tends to be difficult to measure the positive electrode potential.

Further, a too low positive electrode potential means an excessive weight of the negative electrode, and the energy density will rather decrease. It is usually at least 0.1 V, preferably at least 0.3 V.

In the present invention, the capacitance and the capacity are defined as follows. The capacitance of a cell represents the slope of a discharge curve of a cell and its unit is F (farad); the capacitance per unit weight of a cell is a value obtained by dividing the capacitance of a cell by the total weight of the positive electrode active material and the negative electrode active material put in a cell and its unit is F/g; the capacitance of a positive electrode represents the slope of a discharge curve of a positive electrode and its unit is F; the capacitance per unit weight of a positive electrode is a value obtained by dividing the capacitance of a positive electrode by the weight of a positive electrode active material put in a cell and its unit is F/g; and the capacitance per unit weight of a negative electrode is a value obtained by dividing the capacitance of a negative electrode by the weight of a negative electrode active material put in a cell and its unit is F/g.

Further, the cell capacity is a product of the capacitance of a cell and a difference between the discharge start voltage and the discharge end voltage of a cell i.e. a change in voltage, and its unit is C (coulomb). 1C is charge quantity when 1A current flows in one second, and thus the unit is calculated as mAh in the present invention. The positive electrode capacity is a product of the capacitance of the positive electrode and a difference (a change in the positive electrode potential) in the positive electrode potential between the discharge start and the discharge end potential, and its unit is C or mAh. Similarly, the negative electrode capacity is a product of the capacitance of the negative electrode, and a difference (change in negative electrode potential) in the negative electrode potential between the discharge start and the discharge end potential, and its unit is C or mAh. The cell capacity agrees with the positive electrode capacity and the negative electrode capacity.

Figure 2:
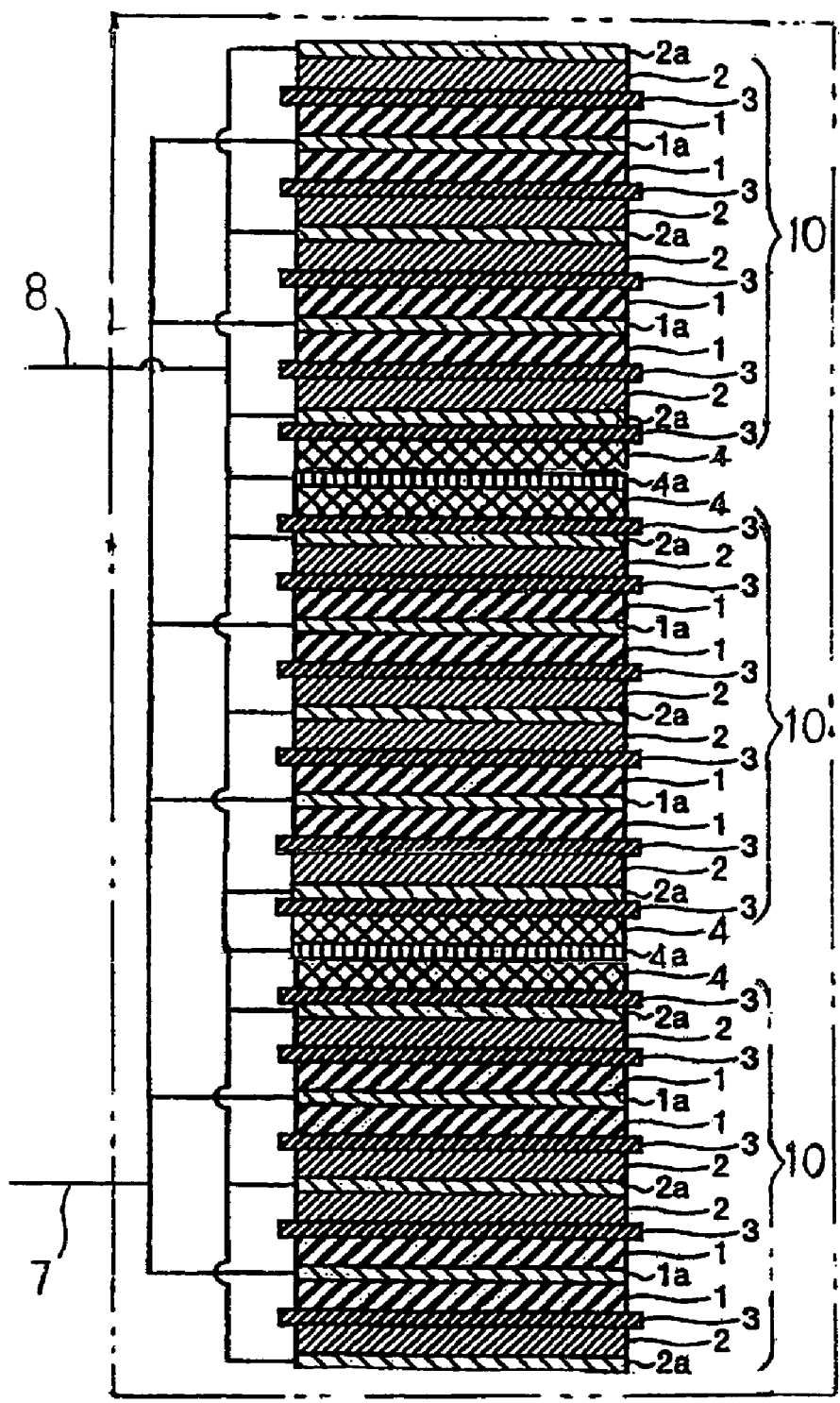
FIG. 2 is a schematic view illustrating a lithium ion capacitor as a preferred embodiment of the present invention.
Figure 5:
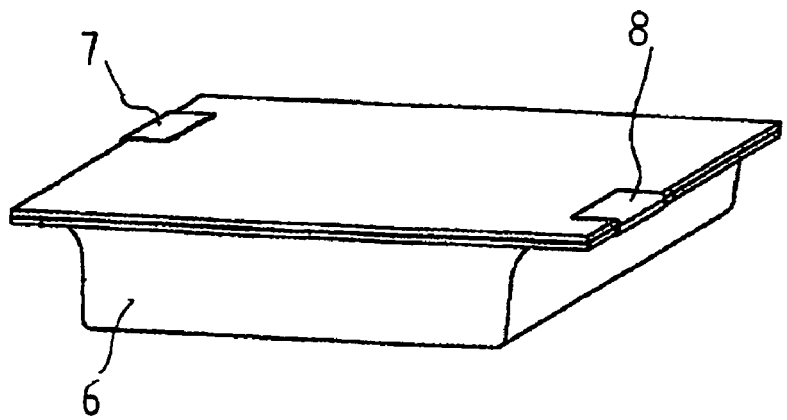
FIG. 5 is a perspective view illustrating a lithium ion capacitor as an embodiment of the present invention.

Now, the structure of the lithium ion capacitor of the present invention will be explained with reference to the drawings. The following drawings are to exemplify preferred embodiments of the present invention, and the present invention is by no means restricted thereto. FIG. 1 is a front view illustrating an electrode unit constituting LIC (hereinafter sometimes referred to as a cell) of the present invention, and FIG. 2 is a schematic view illustrating a cell constituted of three such electrode units. In the present invention, as shown in FIG. 2, the cell is constituted in such a manner that positive electrodes 1 and negative electrodes 2 are alternately laminated with a separator 3 interposed therebetween to constitute an electrode unit 10, and three such electrode units 10 are laminated for assembling, and lithium metal (lithium electrode) 4 as a lithium ion supply source is disposed between the electrode units. The outside of the cell thus constituted is wrapped with an outer container 6 as shown in FIG. 5, and an electrolytic solution (electrolyte) capable of transferring lithium ions is injected in the interior thereof, followed by sealing, and the outer container is left in such a state for a predetermined time (10 days for example), whereby the negative electrodes 2 can be preliminarily doped with lithium ions from the lithium metal 4.

The number of the electrode units 10 constituting the cell is not particularly limited regardless of the number of laminated electrodes used in the electrode unit and the size (capacity) of the cell, so long as it is at least two. However, it is preferably at least three, and usually from 2 to 4, so as to reduce the number of electrodes laminated in the electrode unit as much as possible and to increase the number of the electrode units correspondingly thereby to shorten the time of doping with lithium ions or to obtain a large capacity cell. By reducing the number of electrodes laminated in the electrode unit and increasing the number of the electrode units, a large capacity cell can be obtained in a short time of doping with lithium ions. In this example, the electrode units 10 are laminated in a horizontal direction and accommodated in the outer container 6, but the electrode units 10 may be accommodated in the outer container 6 in a vertical direction.

In the present invention, the "positive electrode" means an electrode on the side where a current flows out during discharging and a current flows in during charging, and the "negative electrode" means an electrode on the side where a current flows in during discharging and a current flows out during charging.

As shown in FIG. 1, the electrode unit 10 is constituted by alternately laminating positive electrodes 1 each formed on a positive electrode current collector 1a and negative electrodes 2 each formed on a negative electrode current collector 2a with a separator 3 interposed therebetween so that they are not in direct contact with one another. In this case, the positive electrodes 1 and the negative electrodes 2 constituting the electrode unit 10 are not limited, but the number of each electrode is preferably at least three layers and is usually from about 10 to about 20 layers.

Figure 3:
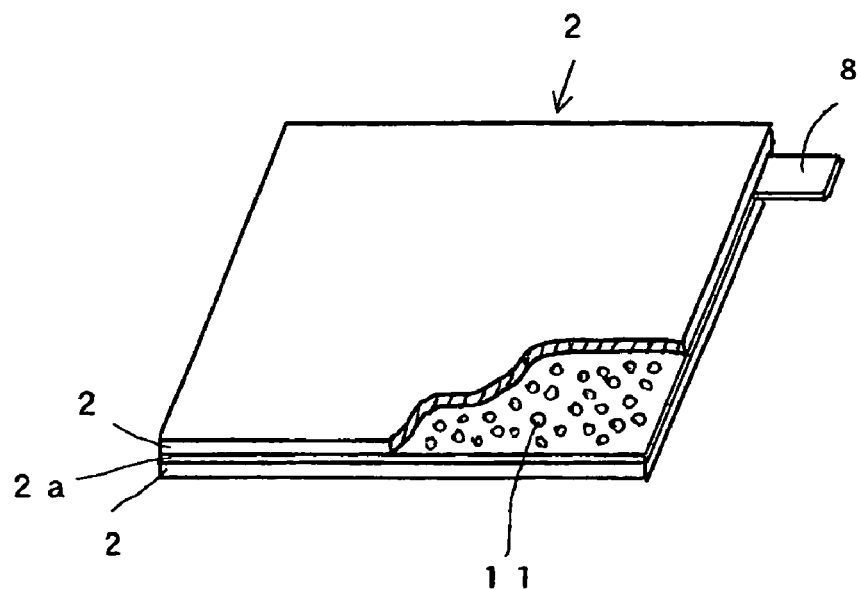
FIG. 3 is a partially cutaway perspective view illustrating a negative electrode.

FIG. 3 is a partially cutaway view illustrating a negative electrode 2 laminated in the middle of the electrode unit 10. The negative electrode 2 to be laminated in the middle of the electrode unit 10 is preferably formed on both sides of a negative electrode current collector 2a by a negative electrode active material layer, as shown in the drawing. However, it is also possible to form a negative electrode 2 only on one side of the negative electrode current collector 2a. The positive electrode 1 can be formed in the same manner as in the negative electrode 2 except that it is formed by a positive electrode active material layer, although it is not shown.

The negative electrode current collector 2a is a porous material having pores 11 penetrating from the front surface to the back surface as shown in FIG. 3, and it has a lead-out portion 9 at a part of its side edge portion. The positive electrode current collector 1a also has the same structure. By using a porous material having pores 11 for each of the negative electrode current collector 2a and the positive electrode current collector 1a, lithium ions can freely move between electrodes via the through pores. The shape of the pores provided on the current collector is not particularly limited.

On the other hand, lithium metal 4 to be disposed between the electrode units is formed by pressure bonding lithium metal preferably on both sides of a lithium electrode current collector 4a. The lithium electrode current collector 4a preferably has a porous structure so that lithium metal is easy to be pressure bonded thereto and lithium ions can pass therethrough, and it has a lead-out portion to be connected with a negative electrode connection terminal at a part of its side edge portion.

In the electrode unit 10 of the present invention, the outermost portion is preferably the separator 3. Namely, in FIG. 1, the upper and lower portions of the electrode unit 10 are preferably separators 3, and further, the inner surfaces of the separators are preferably negative electrodes 2. By employing the separators 3 as the outermost portions of the electrode unit 10, advantages will be obtained such that direct contact of lithium metal 4 with the electrode can be avoided, whereby it is possible to prevent the surface of the electrode from being damaged by quick doping after injection of the electrolytic solution, the electrodes can be protected by being covered with the separators 3, and attachment of impurities on the surface of the electrodes can be prevented. Further, when the inner surfaces of the separator 3 is the negative electrode 2 and the outside of the electrode unit is the negative electrode 2, an advantage will be obtained such that there will be no problem even when the negative electrodes 2 and lithium metal 4 are short-circuited.

The lamination number of the positive electrodes 1 and the negative electrodes 2 constituting the electrode unit 10 is not particularly limited, but if the number of layers laminated is excessively large, the number of negative electrodes to be preliminarily doped with lithium ions after the cell is assembled increases, and the doping time will be long resultingly. In a case where lithium metal 4 is disposed only between the electrode units 10 as in this example, the doping time tends to be long particularly at the electrode units disposed at the ends of the cell.

In the present invention, it is preferred that the outside of the electrode units 10 is fixed with a tape 5 as shown in FIG. 1. In a case where the separator 3 is laminated on the outermost portion of the electrode unit 10, the electrode unit can be fixed by taping over the separator. The material of the tape 5 to be used is not particularly limited so long as it has durability against the electrolytic solution and it has no adverse effect on the electrodes and the like, and preferred is a porous one through which lithium ions can be transferred, and the same material as for the separator 3 is most suitably used.

The thickness and the width of the tape 5 are not particularly limited, but preferred is a tape having a thickness of from about 50 to about 100 μm and a width of from about 5 to about 10 mm, with which the electrode unit can be fixed stably and good workability will be obtained. As the method of fixing with the tape, a suitable method may be employed. Further, the position and the number of the tape 5 to fix the electrode unit 10 may be suitably selected depending upon the size of the electrode unit, the tape to be used, etc. and are not particularly limited. When the electrode unit has a width from about 30 to about 80 mm for example, the electrode unit can be fixed stably at two positions as in this example.

Figure 4:
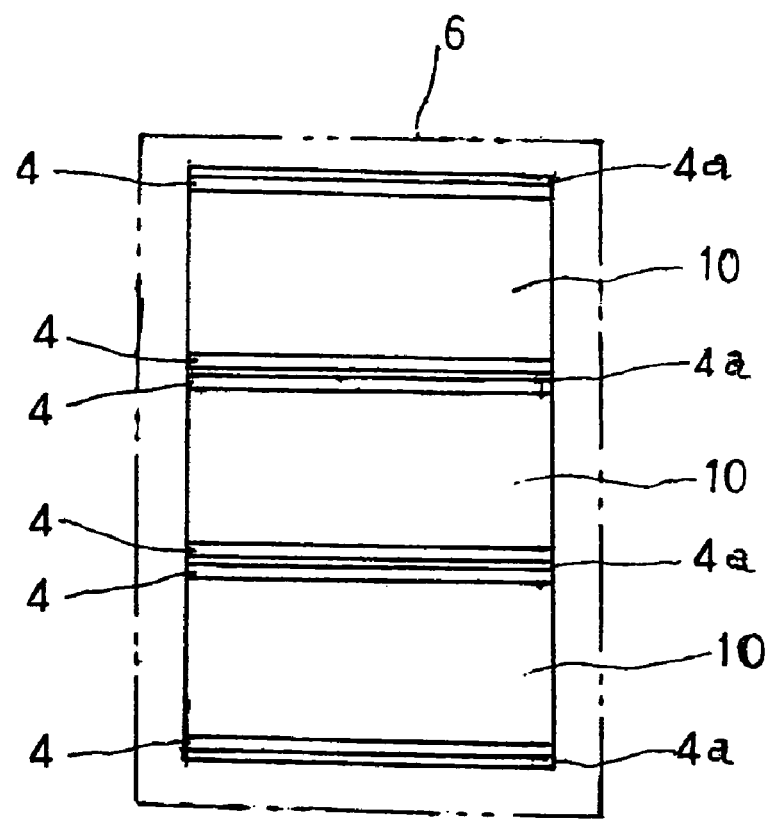
FIG. 4 is a schematic view illustrating a lithium ion capacitor as another preferred embodiment of the present invention.

FIG. 4 illustrates another preferred embodiment of the present invention. This example is an example wherein in addition to the lithium metal 4 disposed between the electrode units 10 constituting the cell, other lithium metals 4 are disposed on the outside of each of the electrode units at the ends of the cell as shown in the drawing. Namely, as the cell of this example is constituted of three electrode units, lithium metal 4 is disposed at the two portions between the electrode units and the two portions on the outside of the electrode units disposed on the upper and lower portions of the cell (totally four portions). The structure of the electrode unit 10 and lithium metal to be disposed between the electrode units are substantially the same as those in FIG. 2. However, as the lithium metals to be disposed on the outside of the electrode units, lithium metal formed on one side of a lithium electrode current collector 4a is used as shown in FIG. 4.

By densely disposing lithium metal 4 in such a manner, the negative electrodes 2 can be doped with lithium ions evenly in a short time. Further, such disposition of lithium metal 4 facilitates an increase in the number of electrode units constituting the cell, and doping with lithium ions will not be influenced even if the number of the electrode units is increased. Accordingly, the degree of freedom of the cell design will increase and at the same time, a lithium ion capacitor having a large capacity will be easily produced.

Figure 6:
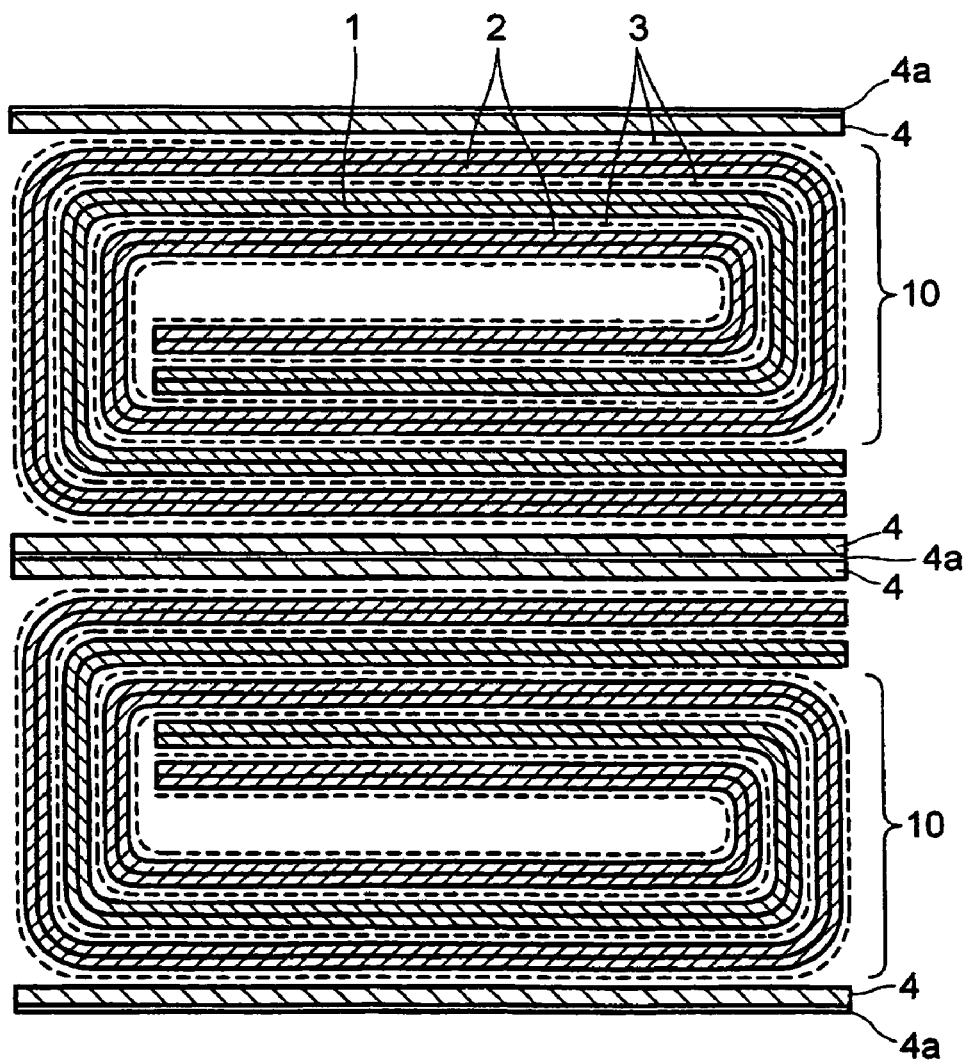
FIG. 6 is a cross section illustrating a lithium ion capacitor according to another embodiment of the present invention.

FIG. 6 is a cross section illustrating a lithium ion capacitor according to another preferred embodiment of the present invention. This example is an example wherein flatted wound electrode units 10 are used, and lithium metal 4 is disposed between the two flatted wound electrode units and on the outer surfaces of the electrode units 10 to constitute a cell. In FIG. 6, an outer container is omitted. The wound electrode unit 10 can be obtained, for example, in such a manner that a positive electrode 1 having electrode layers on both sides of a positive electrode current collector and a negative electrode 2 having electrode layers on both sides of a negative electrode current collector are wound in an elliptic form with a separator interposed therebetween, and the wound layers were pressed from both sides. Accordingly, such a wound electrode unit can be easily produced as compared with an electrode unit obtained by lamination, thus improving productivity of the cell. Also in the wound electrode unit 10, the outermost portion is preferably the separator 3 from the same reasons as mentioned above, and the inner side of the separator 3 is preferably the negative electrode. As the current collectors for the electrodes (positive electrode 1 and negative electrode 2) and a lithium electrode current collector 4a, a porous body having through pores is used in the same manner as in the case of the electrode units obtained by lamination.

Now, chief components constituting the lithium ion capacitor of the present invention will be explained sequentially below. For the positive electrode current collector and the negative electrode current collector of the present invention, various materials proposed for use in e.g. an organic electrolyte battery can be usually used. For the positive electrode current collector, aluminum, stainless steel, etc. can be suitably used, and for the negative electrode current collector, stainless steel, copper, nickel, etc. can be suitably used. Further, various shapes such as a foil and a net can be employed. Particularly in order that lithium ions are preliminarily supported by the negative electrode and/or the positive electrode, preferred is one having pores penetrating from the front surface to the back surface, such as an expanded metal, a perforated metal, a metal net, a foam or a porous foil having through pores imparted by etching. The through pores of the electrode current collector may, for example, be round or rectangular, and may suitably be set.

More preferably, before formation of an electrode, at least some of the through pores on the electrode current collector are filled with an electrically conductive material which is less likely to come off, and each of a positive electrode and a negative electrode is formed thereon, whereby productivity of the electrode will improve and further, a problem of a decrease in reliability of a capacitor by detachment of the electrode will be solved. Further, the electrode including the current collector can be made thin, whereby a high energy density and a high power density will be realized.

The shape, number, etc. of the through pores of the electrode current collector may suitably be set so that lithium ions in an electrolytic solution as described hereinafter can move from the front surface to the back surface of the electrode without being blocked by the electrode current collector, and that the pores will easily be clogged with an electrically conductive material.

The porosity of the electrode current collector is defined by calculating the ratio {1-(weight of the current collector/true specific gravity of the current collector)/(apparent volume of the current collector)} as percentage. The porosity of the electrode current collector to be used in the present invention is usually from 10 to 79%, preferably from 20 to 60%. It is desirable to suitably select the porosity and the pore size of the electrode current collector from the above range considering the structure and the productivity of the cell.

The above negative electrode active material is not particularly limited so long as it can reversibly support lithium ions, and it may, for example, be graphite, hardly graphitizable carbon or a polyacenic organic semiconductor (PAS) which is a heat-treated aromatic condensed polymer having a polyacenic skeleton structure with an atomic ratio of hydrogen atoms/carbon atoms from 0.50 to 0.05. Among them, PAS is more preferred with a view to obtaining a large capacity. A capacitance of at least 650 F/g will be obtained when lithium ions in an amount of 400 mAh/g are supported (charged) by PAS, followed by discharging, and a capacitance of at least 750 F/g will be obtained when lithium ions in an amount of at least 500 mAh/g are charged. Thus, it is understood that PAS has a very large capacitance.

In the preferred embodiment of the present invention, in a case where an active material having an amorphous structure such as PAS is used for the negative electrode, the lager the amount of lithium ions to be supported, the lower the potential is. Thus the withstand voltage (charging voltage) of a storage device to be obtained tends to increase, and the voltage-increasing rate (the slope of the discharge curve) in discharging tends to be low. Therefore, it is desirable to suitably set the amount of lithium ions within the lithium ion absorbing ability of the active material depending upon the desired working voltage of the storage device.

Further, PAS, which has an amorphous structure, is free from structural changes such as swelling and contraction due to insertion and release of lithium ions and is thereby excellent in cyclic characteristics. Further, it has an isotropic molecular structure (a higher-order structure) for insertion and release of lithium ions and thereby has excellent characteristics in quick charging and quick discharging, and accordingly it is suitable as a negative electrode material.

An aromatic condensed polymer which is a precursor of PAS is a condensed product of an aromatic hydrocarbon compound with an aldehyde. The aromatic hydrocarbon compound may be suitably a so-called phenol such as phenol, cresol or xylenol. Specifically, it may be a methylene-bisphenol represented by the following formula:

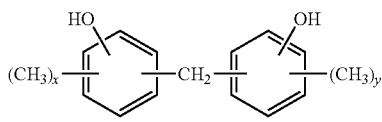

wherein each of x and y which are independent of each other, is 0, 1 or 2, or a hydroxy-bisphenyl or a hydroxynaphthalene. Among them, practically a phenol, particularly phenol is suitable.

Further, the aromatic condensed polymer may also be a modified aromatic condensed polymer having part of the above aromatic hydrocarbon compound having a phenolic hydroxyl group substituted by an aromatic hydrocarbon compound having no phenolic hydroxyl group such as xylene, toluene or aniline, for example, a condensed product of phenol, xylene and formaldehyde. Further, a modified aromatic polymer substituted by melamine or urea may also be used, and a furan resin is also suitable.

In the present invention, PAS may be produced, for example, from the above aromatic condensed polymer as follows. Namely, the aromatic condensed polymer is gradually heated to an appropriate temperature of 400 to 800° C. in a non-oxidizing atmosphere (including vacuum) to obtain an insoluble and infusible substrate having an atomic ratio of hydrogen atoms/carbon atoms (hereinafter referred to as H/C) of 0.5 to 0.05, preferably of 0.35 to 0.10.

However, the method of producing the insoluble and infusible substrate is not limited thereto, and it is possible to obtain an insoluble and infusible substrate having the above H/C and having a specific surface area of at least 600 m$^2$/g as measured by BET method, by a method as disclosed in JP-B-3-24024, for example.

With respect to the insoluble and infusible substrate to be used in the present invention, from X-ray diffraction (CuKα), the main peak is present at the position of at most 24° as represented by 2θ, and another broad peak is present at a position of between 41 and 46° in addition to the above main peak. Namely, the insoluble and infusible substrate has a polyacenic skeleton structure having an aromatic polycyclic structure appropriately developed, has an amorphous structure, and is capable of being stably doped with lithium ions, and is thereby suitable as an active material for a lithium storage device.

In the present invention, the negative electrode active material is preferably one having a pore diameter of at least 3 nm and a pore volume of at least 0.10 ml/g, and the upper limit of the pore diameter is not limited but is usually from 3 to 50 nm. Further, the range of the pore volume is also not particularly limited, but is usually from 0.10 to 0.5 ml/g, preferably from 0.15 to 0.5 ml/g.

In the present invention, the negative electrode is formed on a negative electrode current collector from a powder of a negative electrode active material such as the above carbon material or PAS, and its method is not limited and a known method may be used. Specifically, it can be formed by dispersing the negative electrode active material powder, a binder and if necessary, an electrically conductive powder in an aqueous or organic solvent to obtain a slurry, and applying the slurry on the current collector or preliminarily forming the slurry into a sheet, and bonding the sheet on the current collector. The binder to be used may, for example, be a rubber type binder such as SBR, a fluororesin such as polytetrafluoroethylene or polyvinylidene fluoride, or a thermoplastic resin such as a polypropylene or a polyethylene. Among them, a fluorinated binder is preferred, a fluorinated binder having an atomic ratio of fluorine atoms/carbon atoms (hereinafter referred to as F/C) of at least 0.75 and less than 1.5, is more preferred, and a fluorinated binder having a F/C of at least 0.75 and less than 1.3, is furthermore preferred. The amount of the binder to be used varies depending upon the type of the negative electrode active material, the electrode shape, etc., but it is from 1 to 20 wt %, preferably from 2 to 10 wt %, for the negative electrode active material.

Further, the electrically conductive material to be used if necessary may, for example, be acetylene black, graphite or a metal powder. The amount of the electrically conductive material to be used varies depending upon the electrical conductivity of the negative electrode active material, the electrode shape, etc., but a proportion of 2 to 40 wt % for the negative electrode active material is suitable. Although the thickness of the negative electrode active material is set in balance with the thickness of the positive electrode active material so as to secure the energy density of the cell, considering the output density and the energy density of the cell, industrial productivity, etc, the thickness is usually 15 to 100 μm, preferably 20 to 80 μm, on one side of a current collector.

In LIC of the present invention, the positive electrode contains a positive electrode active material capable of reversibly supporting lithium ions and/or anions such as tetrafluoroborate.

The positive electrode active material is not particularly limited so long as it can reversibly support lithium ions and/or anions, and it may, for example, be an activated carbon, an electrically conductive polymer, or a polyacenic organic semiconductor (PAS) which is a heat-treated aromatic condensed polymer having a polyacenic skeleton structure with an atomic ratio of hydrogen atoms/carbon atoms of 0.05 to 0.50.

A method of forming a positive electrode on a positive electrode current collector by using the above positive electrode active material is substantially the same as in the case of the above negative electrode, and its detailed description is omitted.

Further, in LIC of the present invention, it is preferred that the capacitance per unit weight of the negative electrode active material is at least three times the capacitance per unit weight of the positive electrode active material and that the weight of the positive electrode active material is larger than the weight of the negative electrode active material. By properly controlling the amount of lithium ions charged in the negative electrode (pre-doping amount) considering the capacitance of the positive electrode to be used, it is possible that the capacitance of at least three times the capacitance per positive electrode unit weight is secured, and that the positive electrode active material weight can be made larger than the negative electrode active material weight. In such a manner, a capacitor having a higher voltage and a larger capacity as compared with a conventional electric double layer capacitor will be obtained. Further, in a case where a negative electrode having a capacitance per unit weight larger than the capacitance per unit weight of the positive electrode is used, it becomes possible to reduce the negative electrode active material weight without changing the change in potential of the negative electrode, whereby the amount of the positive electrode active material charged tends to increase, whereby the capacitance and the capacity of the cell can be increased. The positive electrode active material weight is preferably larger than the negative electrode active material weight, and it is more preferably from 1.1 times to 10 times. If it is less than 1.1 times, the difference in capacity tends to be small, and if it exceeds 10 times, the capacity may be small on the contrary in some cases, and the difference in thickness between the positive electrode and the negative electrode will be too significant and such is unfavorable in view of the cell structure.

As an electrolyte to be used in LIC of the present invention, an electrolyte capable of transferring lithium ions is used. Such an electrolyte is preferably one which is usually a liquid and which can infiltrate into a separator. As a solvent for such an electrolyte, preferred is an aprotic organic solvent capable of forming an aprotic organic solvent electrolytic solution. The aprotic organic solvent may, for example, be ethylene carbonate, propylene carbonate, dimethyl carbonate, diethyl carbonate, γ-butyrolactone, acetonitrile, dimethoxyethane, tetrahydrofuran, dioxolane, methylene chloride or sulfolane. Further, a liquid mixture having two or more of such aprotic organic solvents mixed may also be used.

Further, an electrolyte to be dissolved in the solvent may be one which is capable of transferring lithium ions and which will not cause electrolysis even at a high voltage, and in which lithium ions can be stably present. Such an electrolyte may, for example, be preferably a lithium salt such as $LiClO_4$, $LiAsF_6$, $LiBF_4$, $LiPF_6$ or $Li(C_2F_5SO_2)_2N$.

The above electrolyte and solvent are mixed in a sufficiently dehydrated state to obtain an electrolytic solution. The concentration of the electrolyte in the electrolytic solution is preferably at least 0.1 mol/l so as to reduce the internal resistance due to the electrolytic solution, more preferably within a range from 0.5 to 1.5 mol/l.

Further, as a separator, e.g. a porous body having durability against the electrolytic solution, the electrode active material, etc., having through pores and having no electrical conductivity may be used. The material of the separator may, for example, be a cellulose (paper), a polyethylene or a polypropylene, and known one may be used. Among them, a cellulose (paper) is excellent in view of durability and economical efficiency. The thickness of the separator is not limited but is usually preferably about 20 to about 50 μm.

In LIC of the present invention, when two or more electrode units are laminated in a horizontal direction or in a vertical direction to constitute a cell, as mentioned above, lithium metal is disposed as a lithium ion supply source so that lithium ions are preliminarily supported by the negative electrode and/or the positive electrode, between the electrode units to be laminated, or further on the outside of one or both of the electrode units disposed on both ends of the cell. As the lithium metal, a material containing at least lithium element and capable of supplying lithium ions is used, such as lithium metal or a lithium/aluminum alloy.

In such a case, as the amount of the lithium ion supply source (the weight of the material capable of supplying lithium ions such as lithium metal) to be disposed in the interior of the capacitor, an amount with which a predetermined capacity of the negative electrode will be obtained is sufficient. However, when an amount larger than this amount is disposed, only a predetermined amount of the lithium metal is used and the lithium metal is left in the interior of the capacitor. However, considering the safety, it is preferred to dispose only a required amount so that the entire amount is supported by the negative electrode and/or the positive electrode.

In the present invention, it is preferred to form the lithium metal on a lithium electrode current collector comprising an electrically conductive porous body. The electrically conductive porous body to be the lithium electrode current collector is preferably a metal porous body which will not react with the lithium ion supply source, such as a stainless steel mesh.

For example, in a case where lithium metal is used as the lithium ion supply source and an electrically conductive porous body such as a stainless steel mesh is used as the lithium electrode current collector, it is preferred that at least part of the lithium metal, preferably at least 80 wt % thereof, is embedded in the pore portion of the lithium electrode current collector, whereby even after lithium ions are supported by the negative electrode, the space to be formed between the electrodes by disappearance of the lithium metal tends to be small, and reliability of LIC will be more securely maintained.

In a case where the lithium metal is formed on the lithium electrode current collector, the lithium metal may be formed on one side or both sides of the porous lithium electrode current collector. That is, in the case of the lithium metal to be disposed between the electrode units, it is preferred to form the lithium metal on both sides of the lithium electrode current collector by pressure bonding, with a view to doping the negative electrode with lithium ions evenly and efficiently. However, even when the lithium metal is formed only on one side of the lithium electrode current collector, lithium ions can be transferred to the other side via the pore portion and supported by the negative electrode, and such is preferred in view of simple process. However, in the case of the lithium metal to be disposed on the outside of the electrode unit disposed at the end of the cell, it is preferred to form the lithium metal only on one side of the lithium electrode current collector which faces the negative electrode of the electrode unit. The thickness of the lithium metal to be pressure bonded on the lithium electrode current collector is suitably determined considering the amount of lithium ions to be preliminarily supported by the negative electrode and is not limited, but usually it is from about 50 to about 300 μm on one side of the lithium electrode current collector.

The material of the outer container of LIC of the present invention is not particularly limited, and various materials commonly used for batteries and capacitors may be used. For example, a metal material such as iron or aluminum, a plastic material or a composite material comprising a laminate thereof, may, for example, be used. Further, the shape of the outer container is not particularly limited and is suitably selected from a cylindrical form, a rectangular form, etc. depending upon the purpose of application. In view of reduction in size and reduction in weight of LIC, preferred is an outer container in the form of a film using a laminate film of aluminum with a polymer material such as nylon or polypropylene.

Now, one example of a process for producing LIC of the present invention will be shown below. The through pores of the electrode current collector of LIC may be filled in or may not be filled in with an electrically conductive material, but this example is to explain a case where they are filled in. The through pores of the electrode current collector may be filled in by a known means such as spraying using for example a carbon type electrically conductive material.

Then, each of a positive electrode and a negative electrode is formed on the electrode current collector of which the through pores are filled in with an electrically conducive material. The positive electrode is formed by mixing a positive electrode active material with a binder resin to form a slurry, which is applied on the current collector for a positive electrode and dried. Likewise, the negative electrode is formed by mixing a negative electrode active material with a binder resin to form a slurry, which is applied on the current collector for a negative electrode and dried.

A lithium electrode is formed by pressure bonding lithium metal on a lithium electrode current collector comprising an electrically conductive porous body. The thickness of the lithium electrode current collector is about 10 to about 200 µm, and the thickness of the lithium metal depends on the amount of the negative electrode active material used but is usually from 50 to about 300 µm.

After the electrode is dried, it is cut into a width fitted with the size of the outer container of the cell. On that occasion, it is preferred to cut it into a shape having a lead-out portion as a lead welding portion.

Then, electrode current collectors having electrodes formed thereon are laminated with a separator interposed between the positive electrode and the negative electrode so that they are not in direct contact with each other to assemble an electrode unit, and the outside of the electrode unit is fixed with a tape. On that occasion, the lead-out portions of the positive electrode and the negative electrode are arranged at a predetermined position.

The lead-out portion of the positive electrode current collector of the assembled electrode unit is welded to the positive electrode terminal, and the lead-out portions of the negative electrode current collector and the lithium electrode current collector are welded to the negative electrode terminal, e.g. by ultrasonic welding.

At least two such electrode units are stacked in an outer container with lithium metal disposed between the electrode units, and preferably with lithium metal disposed on the lower and upper portions of the laminate of the electrode units, and the outer container is closed by e.g. heat sealing with an inlet for an electrolytic solution being left unclosed. At least part of the external terminal is exposed to the outside of the outer container so that it can be connected to an external circuit. An electrolytic solution is injected from the inlet for an electrolytic solution of the outer container so that the outer container is filled with the electrolytic solution, and then the inlet for an electrolytic solution is closed by e.g. heat sealing so that the outer container is completely sealed, to obtain a lithium ion capacitor of the present invention.

When the electrolytic solution is injected, all the negative electrodes and the lithium metals are electrochemically contacted with one another, lithium ions dissolved from the lithium metals into the electrolytic solution move toward the negative electrodes as time goes by, and lithium ions in a predetermined amount are supported by the negative electrodes. At the time of making the lithium ions be supported by the negative electrode, it is preferred to make a device such as application of an external force for fixation so as to prevent deformation of the negative electrode due to strain caused by infiltration of lithium ions into the negative electrode, which may impair flatness of the negative electrode. Particularly in the case of a film battery, the contact pressure from the outer container tends to be weaker than that of batteries using a metal case such as a cylindrical battery and a rectangular battery, whereby it is preferred to apply an external pressure to secure flatness of the positive electrode and the negative electrode, whereby the cell itself is less likely to be distorted, and the cell performance will improve.

In LIC in the preferred embodiment of the present invention, an active material capable of reversibly supporting lithium ions and/or anions is used for the positive electrode, an aprotic organic solvent solution of a lithium salt is used for the electrolyte, the negative electrode has a capacitance of at least three times the capacitance per unit weight of the positive electrode active material, the positive electrode active material weight is larger than the negative electrode active material weight, lithium metal to preliminarily dope the negative electrode with lithium ions is provided in the cell, and the negative electrode before charged can be preliminarily doped with lithium ions. Further, by constituting the cell by at least two electrode units and disposing lithium metal between the electrode units, a large capacity cell can be easily assembled.

Further, by using a negative electrode having a large capacitance per unit weight relative to the capacitance per unit weight of the positive electrode, it becomes possible to reduce the negative electrode active material weight with the change in potential of the negative electrode being unchanged, whereby the amount of the positive electrode active material to be charged will be large, and the capacitance and the capacity of the cell will be large. Further, as the capacitance of the negative electrode is large, the change in potential of the negative electrode tends to be small, and resultingly the change in potential of the positive electrode tends to be large, and the capacitance and the capacity of the cell tend to be large.

Further, in a conventional electric double layer capacitor, the positive electrode potential will lower only to about 3 V at the time of discharging, but in the lithium ion capacitor ranging the present invention, the positive electrode potential will lower to 3 V or below as the negative electrode potential is low, whereby a larger capacity as compared with a conventional electric double layer capacitor will be achieved.

Still further, by preliminarily doping the negative electrode with lithium ions in a predetermined amount so as to obtain a required capacity as a negative electrode capacity, the working voltage can be set to be 3 V or higher, and the energy density will improve, as compared with the working voltage of a conventional capacitor of from about 2.3 to about 2.7 V.

Now, the present invention will be explained in detail with reference to specific Examples.

EXAMPLES

Example 1

Process for Producing Negative Electrode 1

A phenol resin molded plate having a thickness of 0.5 mm was put in a Siliconit electric furnace and subjected to a heat treatment by increasing the temperature at a rate of 50° C./hour to 500° C. and further at a rate of 10° C./hour to 660° C. in a nitrogen atmosphere thereby to synthesize PAS. The PAS plate thus obtained was pulverized with a disk mill to obtain a PAS powder. The PAS powder had a H/C ratio of 0.21.

Then, 100 parts by weight of the above PAS powder and a solution having 10 parts by weight of a vinylidene polyfluoride powder dissolved in 80 parts by weight of N-methylpyrrolidone were sufficiently mixed to obtain a slurry. This slurry was applied on one surface of a copper foil having a thickness of 18 µm in an amount of about 7 mg/cm$^2$ as a solid content, dried and pressed to obtain a PAS negative electrode 1.

Process for Producing Positive Electrode 1

100 Parts by weight of a commercial activated carbon powder having a specific surface area of 1,950 m$^2$/g and a solution having 10 parts by weight of a vinylidene polyfluoride powder dissolved in 100 parts by weight of N-methylpyrrolidone were sufficiently mixed to obtain a slurry. This slurry was applied on one surface of an aluminum foil having a thickness of 20 µm coated with a carbon type electrically conducted coating, in an amount of about 7 mg/cm$^2$ as a solid content, dried and pressed to obtain a positive electrode 1.

Measurement of Capacitance per Unit Weight of Positive Electrode 1

The above positive electrode 1 was cut out into a positive electrode for evaluation having a size of 1.5×2.0 cm². The positive electrode and lithium metal having a size of 1.5×2.0 cm² and a thickness of 200 μm as a counter electrode were overlaid with a polyethylene nonwoven fabric having a thickness of 50 μm as a separator interposed therebetween to assemble a mimic cell. Lithium metal was used as a reference electrode. As an electrolytic solution, a solution having $LiPF_6$ dissolved at a concentration of 1 mol/l in propylene carbonate was used.

Charge to 3.6 V at a charge current of 1 mA was carried out and then constant voltage charge was carried out, and after a total charge time of 1 hour, discharge was carried out to 2.5 V at 1 mA. The capacitance per unit weight of the positive electrode 1 was obtained from the discharge time from 3.5 V to 2.5 V and found to be 92 F/g.

Measurement of Capacitance per Unit Weight of Negative Electrode 1

The negative electrode 1 was cut into four negative electrodes for evaluation having a size of 1.5×2.0 cm². Each of the negative electrodes and lithium metal having a size of 1.5×2.0 cm² and a thickness of 200 μm as a counter electrode were overlaid with a polyethylene nonwoven fabric having a thickness of 50 μm as a separator interposed therebetween to assemble a mimic cell. Lithium metal was used as a reference electrode. As an electrolytic solution, a solution having $LiPF_6$ dissolved at a concentration of 1 mol/l in propylene carbonate was used.

Lithium ions were charged in an amount of 280 mAh/g, 350 mAh/g, 400 mAh/g or 500 mAh/g based on the negative electrode active material weight at a charge current of 1 mA, and then discharge to 1.5 V was carried out at 1 mA. The capacitance per unit weight of the negative electrode 1 was obtained from the discharge time over which the potential of the negative electrode changed by 0.2 V from the potential one minute went on after initiation of the discharge. The results are shown in Table 1.

TABLE 1

| Charge amount (mAh/g) | 280 | 350 | 400 | 500 |
|---|---|---|---|---|
| Capacitance per unit weight of negative electrode 1 (F/g) | 308 | 463 | 661 | 758 |

The charge amount in this Example is a value obtained by dividing an integrated charge current which was applied to the negative electrode by the negative electrode active material weight, and its unit is mAh/g.

Process for Producing Negative Electrode 2

The above slurry for the negative electrode 1 was applied on both sides of copper expanded metal (manufactured by Nippon Metal Industry, Co., Ltd.) having a thickness of 32 μm (porosity 50%) by a die coater, followed by pressing to obtain a negative electrode 2 having an entire thickness (the total of the thickness of the negative electrode layers on both sides and the thickness of the negative electrode current collector) of 148 μm.

Process for Producing Positive Electrode 2

A non-aqueous carbon type electrically conductive coating (manufactured by Acheson (Japan) Limited, EB-815) was applied to both sides of aluminum expanded metal (manufactured by Nippon Metal Industry, Co., Ltd.) having a thickness of 35 μm (porosity 50%) by spraying and dried to obtain a current collector for a positive electrode having electrically conductive layers formed thereon. The entire thickness (the total of the current collector thickness and the electrically conductive layer thickness) was 52 μm, and through pores were substantially filled in with the electrically conductive coating. The above slurry for the positive electrode 1 was applied on both sides of the positive electrode current collector by a roll coater, followed by pressing to obtain a positive electrode 2 having an entire thickness (the total of the thickness of the positive electrode layers on both sides, the thickness of the electrically conductive layers on both sides and the thickness of the positive electrode current collector) of 312 μm.

Preparation of Electrode Unit

The negative electrode 2 having a thickness of 148 μm and the positive electrode 2 having a thickness of 312 μm were cut into pieces having a shape as shown in FIG. 3 and a size of 6.0×7.5 cm² (excluding the terminal welding portion), and they were laminated by using as a separator a cellulose/rayon mixed nonwoven fabric having a thickness of 35 μm so that the terminal welding portions of the positive electrode current collectors and the negative electrode current collectors were opposite to each other, and that the positive electrodes and the negative electrodes faced at 20 faces. A separator was disposed at each of the outermost and lowermost portions, and four sides were fixed with a tape, whereby two electrode laminate units were obtained. 10 Positive electrodes and 11 negative electrodes were used for each electrode units. The weight of the positive electrode active material was 1.4 times the weight of the negative electrode active material.

Preparation of Cell 1

As a lithium electrode, two sheets having a lithium metal foil (82 μm, 6.0×7.5 cm², corresponding to 100 mAh/g) pressure bonded on one side of a copper foil having a thickness of 20 μm and one sheet having the foil pressure bonded on both sides, were obtained.

The lithium electrode having lithium metal pressure bonded on both sides was disposed between two electrode units so as to face both the electrode units, and lithium electrodes having lithium metal pressure bonded on one side were disposed on the upper and lower portions to obtain a three electrode laminate unit. On that occasion, the lithium electrodes were disposed so that the side having lithium metal pressure bonded thereon faced the laminate unit. Then, aluminum positive electrode terminals and copper negative electrode terminals each having a width of 50 mm, a length of 50 mm and a thickness of 0.2 mm were inserted into center portions of 20 terminal welding portions of the positive electrode current collectors and 22 terminal welding portions of the negative electrode current collectors, respectively, followed by ultrasonic welding to obtain an electrode unit. On that occasion, insertion of the positive electrode terminals and the negative electrode terminals into the center portions of the terminal welding portions was easily carried out since insertion could be conducted on every unit. The terminal welding portions (2 sheets) of the lithium electrode current collectors were welded to the negative electrode terminal welded portion by resistance welding.

As shown in FIG. 5, the three electrode laminate unit was put in the interior of an outer film deep drawn to 13 mm and covered with an outer laminated film, and three sides were fused. Then, the unit was vacuum impregnated with a solution having $LiPF_6$ dissolved at a concentration of 1 mol/l in a solvent mixture of ethylene carbonate, diethyl carbonate and propylene carbonate in a weight ratio of 3:4:1 as an electrolytic solution, and the remaining one side was fused, whereby four cells of film type capacitors were assembled. The lithium metal disposed in the cell corresponded to 400 mAh/g per negative electrode active material weight.

Cell Initial Evaluation

20 Days after the cells were left to stand after assembled, one cell was decomposed, whereupon the lithium metal completely disappeared. Accordingly, it was judged that the negative electrodes were preliminarily charged with lithium ions so as to obtain a capacitance of 660 F/g per unit weight of the negative electrode active material. The capacitance of the negative electrode is 7.2 times the capacitance of the positive electrode.

Cell Characteristic Evaluation

A constant current/constant voltage charge was carried out for 1 hour, comprising charge at a constant current of 4,000 mA until the cell voltage became 3.6 V and then application of a constant voltage at 3.6 V. Then, discharge was carried out at a constant current of 400 mA until the cell voltage became 1.9 V. This cycle of from 3.6 V to 1.9 V was repeatedly carried out, and the cell capacity and the energy density were evaluated at the third discharge. The results are shown in Table 2. The data are averages of three cells.

TABLE 2

|  | Capacity (mAh) | Energy density (Wh/l) |
| --- | --- | --- |
| Example 1 | 392 | 12.3 |

After completion of the above measurement, the positive electrodes and the negative electrodes were short-circuited and the potential of the positive electrode was measured, whereupon it was 0.95 V, which was at most 2.0 V. A capacitor having a high energy density was obtained by preliminarily supporting lithium ions by the negative electrodes and/or the positive electrodes so that the positive electrode potential would be at most 2.0 V when the positive electrodes and the negative electrodes were short-circuited.

Comparative Example 1

An electrode unit was obtained in the same manner as in Example 1 except that the positive electrodes and the negative electrodes were laminated so that they faced at 40 faces. For each electrode unit, 20 positive electrodes and 21 negative electrodes were used. The positive electrode active material weight was 1.4 times the negative electrode active material weight.

Using as a lithium electrode, an electrode having a lithium metal foil (164 μm, 6.0×7.5 cm$^2$, corresponding to 200 mAh/g) contact bonded on a copper foil having a thickness of 20 μm, one electrode was disposed on each of the upper and lower portions of the electrode unit to face the negative electrode to obtain a three electrode laminate unit. Then, aluminum positive electrode terminals and copper negative electrode terminals each having a width of 50 mm, a length of 50 mm and a thickness of 0.2 mm were inserted into center portions of 20 terminal welding portions of the positive electrode current collectors and 21 terminal welding portions of the negative electrode current collectors, followed by ultrasonic welding. The terminal welding portions (2 sheets) of the lithium electrode current collectors were welded to the negative electrode terminal welded portion by resistance welding. After the welding of the terminals, the same operation as in Example 1 was carried out to assemble 5 cells of film type capacitors (lithium metal in each cell corresponded to 400 mAh/g).

20 Days after the cells were left to stand after assembled, one cell was decomposed, whereupon lithium metal in an amount of about one-third the initial amount remained. The cells were left to stand further for 20 days and then one cell was decomposed, whereupon lithium metal completely disappeared, whereby it was judged that negative electrodes were preliminarily charged with lithium ions so as to obtain a capacitance of 660 F/g per unit weight of the negative electrode active material. The capacitance of the negative electrode is 7.2 times the capacitance of the positive electrode.

In the same manner as in Example 1, constant current/constant voltage charge was carried out for 1 hour, comprising charge at a constant current of 4,000 mA until the cell voltage became 3.6 V and then application of a constant voltage of 3.6 V. Then, discharge was carried out at a constant current of 400 mA until the cell voltage became 1.9 V. This cycle of from 3.6 V to 1.9 V was repeatedly carried out, and the cell capacity and the energy density were evaluated at the third discharge. The results are shown in Table 3. The data are averages of three cells.

TABLE 3

|  | Capacity (mAh) | Energy density (Wh/l) |
| --- | --- | --- |
| Comparative Example 1 | 390 | 12.2 |

After completion of the above measurement, the positive electrodes and the negative electrodes were short-circuited and the potential of the positive electrode was measured, whereupon it was 0.95 V, which was at most 2.0 V. A capacitor having a high energy density was obtained by preliminarily supporting lithium ions by the negative electrodes and/or the positive electrodes so that the positive electrode potential would be at most 2.0 V when the positive electrodes and the negative electrodes were short-circuited.

With a structure wherein 20 positive electrodes and 21 negative electrodes were laminated to obtain one unit and a lithium electrode was disposed on each of the upper and lower portions thereof, although a large cell capacity and a high energy density were achieved, supporting lithium ions by the negative electrodes took long. Further, with respect to welding of the terminals, insertion of terminals at the centers of 20 terminal welding portions could be easily carried out when it was conducted on every electrode unit as in Example 1, but it was difficult when the electrodes employing an expanded metal for the current collector were continuously laminated as in Comparative Example 1, since the current collectors were entangled with one another. Accordingly, in a case where the number of electrodes to be laminated is large, it is preferred to divide the electrodes into two electrode units and to dispose a lithium electrode at three portions (between the electrode units, and the upper and lower portions) as in Example 1, whereby supporting lithium ions will be conducted in a short time, and welding of the terminals will be easily carried out.

Comparative Example 2

A three electrode laminate unit was obtained in the same manner as in Comparative Example 1 except that a lithium electrode having a lithium metal foil (82 μm, 6.0×7.5 cm$^2$, corresponding to 100 mAh/g) pressure bonded on both sides of a copper foil having a thickness of 20 μm, was disposed in the middle of an electrode unit having 20 positive electrodes and 21 negative electrodes laminated, followed by fixing with a tape. The positive electrode active material weight is 1.4 times the negative electrode active material weight. Then, a lithium electrode having a lithium metal foil (82 μm, 6.0×7.5 cm$^2$, corresponding to 100 mAh/g) pressure bonded on one side of a copper foil having a thickness of 20 μm was disposed on each of the upper and lower portions, followed by fixing with a tape. On that occasion, the lithium electrode was disposed so that the side having lithium metal pressure bonded thereon faced the electrode unit. Then, aluminum positive electrode terminals and copper negative electrode terminals each having a width of 50 mm, a length of 50 mm and a thickness of 0.2 mm were inserted into the centers of 20 terminal welding portions of the positive electrode current collectors and 21 terminal welding portions of the negative electrode current collators, followed by ultrasonic welding. The terminal welding portions (two sheets) of the lithium electrode current collectors were welded to the negative electrode terminal welded portion by resistance welding. After the welding of the terminals, the same operation as in Example 1 was carried out to assemble four cells of film type capacitors (lithium metal in the cell corresponded to 400 mAh/g).

20 Days after the cells were left to stand after assembled, one cell was decomposed, whereupon lithium metal disappeared, whereby it was judged that the negative electrodes were preliminarily charged with lithium ions so as to obtain a capacitance of 660 F/g per unit weight of the negative electrode active material.

In the same manner as in Example 1, constant current/constant voltage charge was carried out for 1 hour, comprising charge at a constant current of 4,000 mA until the cell voltage became 3.6 V and then application of a constant voltage of 3.6 V. Then, discharge was carried out at a constant current of 400 mA until the cell voltage became 1.9 V. This cycle of from 3.6 V to 1.9 V was repeatedly carried out, and the cell capacity and the energy density were evaluated at the third discharge. The results are shown in Table 4. The data are averages of three cells.

TABLE 4

|  | Capacity (mAh) | Energy density (Wh/l) |
| --- | --- | --- |
| Comparative Example 2 | 391 | 12.2 |

After completion of the above measurement, the positive electrodes and the negative electrodes were short-circuited and the potential of the positive electrode was measured, whereupon it was 0.95 V, which was at most 2.0 V. A capacitor having a high energy density was obtained by preliminarily supporting lithium ions by the negative electrodes and/or the positive electrodes so that the positive electrode potential would be at most 2.0 V when the positive electrodes and the negative electrodes were short-circuited.

In comparative Example 2, the cell capacity is large and the energy density is high, and the time for supporting lithium ions by the negative electrodes is short, but disposition of a lithium electrode in the middle of laminating 20 positive electrodes and 21 negative electrodes is a complicated production step, and the electrodes are likely to slip even when a unit having a large number of electrodes laminated is fixed with a tape, and a drawback is likely to occur such that positive electrodes and negative electrodes are short-circuited. Further, welding of the terminals was difficult in the same manner as in Comparative Example 1. Accordingly, in a case where the number of electrodes to be laminated is large, it is preferred to employ two units with a half number of electrodes laminated, whereby the electrode units tend to have high stability and the proportion defective can be decreased. When two electrode units are employed, disposition of a lithium electrode at three portions can be easily conducted, and further, the time for supporting lithium ions tends to be short, and welding of the terminals will easily be conducted.

Example 2

Two electrode units were obtained by laminating electrodes so that the positive electrodes and the negative electrodes faced at 20 faces in the same manner as in Example 1. For each electrode unit, 10 positive electrodes and 11 negative electrodes were used. The positive electrode active material weight is 1.4 times the negative electrode active material weight.

As a lithium electrode, two electrodes having a lithium metal foil (82 μm, 6.0×7.5 cm$^2$, corresponding to 100 mAh/g) pressure bonded on one side of a stainless steel net having a thickness of 80 μm and one electrode having a lithium metal foil (164 μm, 6.0×7.5 cm$^2$, corresponding to 200 mAh/g) pressure bonded on one side were obtained.

The lithium electrode having lithium metal of 164 μm pressure bonded was disposed between the two electrode units so as to face the electrode units, and the lithium electrodes having lithium metal of 82 μm pressure bonded on one side were disposed on the upper and lower portions to obtain a three electrode laminate unit. On that occasion, the lithium electrodes were disposed so that the side having lithium metal pressure bonded thereon faced the laminate unit. After preparation of the three electrode laminate unit, the same operation as in Example 1 was carried out to assemble four cells of film type capacitors (lithium metal in each cell corresponded to 400 mAh/g).

20 Days after the cells were left to stand after assembled, one cell was decomposed, whereupon lithium metal disappeared, whereby it was judged that the negative electrodes were preliminarily charged with lithium ions so as to obtain a capacitance of 660 F/g per unit weight of the negative electrode active material.

In the same manner as in Example 1, constant current/constant voltage charge was carried out for 1 hour, comprising charge at a constant current of 4,000 mA until the cell voltage became 3.6 V and then application of a constant voltage of 3.6 V. Then, discharge was carried out at a constant current of 400 mA until the cell voltage became 1.9 V. This cycle of from 3.6 V to 1.9 V was repeatedly carried out, and the cell capacity and the energy density were evaluated at the third discharge. The results are shown in Table 5. The data are averages of three cells.

TABLE 5

|  | Capacity (mAh) | Energy density (Wh/l) |
| --- | --- | --- |
| Example 2 | 391 | 12.2 |

After completion of the above measurement, the positive electrodes and the negative electrodes were short-circuited and the potential of the positive electrode was measured, whereupon it was 0.95 V, which was at most 2.0 V. A capacitor having a high energy density was obtained by preliminarily supporting lithium ions by the negative electrodes and/or the positive electrodes so that the positive electrode potential would be at most 2.0 V when the positive electrodes and the negative electrodes were short-circuited.

In Example 1, since a copper foil was used as the current collector of the lithium electrode, the lithium electrode to be disposed between the electrode units had to have the lithium metal foil be pressure bonded on both sides of the current collector. This is to supply lithium ions to both the electrode units evenly. On the other hand, in Example 2, since a stainless steel net having pores penetrating from the front surface to the back surface is used for the current collector of the lithium electrode, it is possible to supply lithium ions to both the electrode units without lithium ions being blocked by the current collector of the lithium electrode even if a lithium electrode having lithium metal pressure bonded on one side is disposed between the electrode units. It is preferred to pressure bond lithium metal on one side of the current collector of the lithium electrode, in view of simplified process, than to pressure bond lithium metal on both sides. Further, in a case where lithium metal is contact bonded on one side, a lithium metal foil having a thickness twice the thickness of the lithium metal foil to be pressure bonded on both sides is used, and such is favorable since a thick lithium metal foil can be produced with high productivity at a low cost.

Example 3

Five cells of film type capacitors were assembled (lithium metal in each cell corresponded to 400 mAh/g) in the same manner as in Example 2 except that a copper foil of 20 μm was used for the current collector of the lithium electrode.

20 Days after the cells were left to stand after assembled, one cell was decomposed, whereupon part of lithium metal in the lithium electrode disposed between the electrode units remained, but lithium metal in the lithium electrode disposed on each of the upper and lower portions disappeared. The cells were left to stand further for 20 days and then one cell was decomposed, whereupon lithium metal completely disappeared. Accordingly, it was judged that the negative electrodes were preliminarily charged with lithium ions so as to obtain a capacitance of 650 F/g per unit weight of the negative electrode active material. The capacitance of the negative electrode is 7.2 times the capacitance of the positive electrode.

In the same manner as in Example 1, constant current/constant voltage charge was carried out for 1 hour, comprising charge at a constant current of 4,000 mA until the cell voltage became 3.6 V and then application of a constant voltage of 3.6 V. Then, discharge was carried out at a constant current of 400 mA until the cell voltage became 1.9 V. This cycle of from 3.6 V to 1.9 V was repeatedly carried out, and the cell capacity and the energy density were evaluated at the third discharge. The results are shown in Table 6. The data are averages of three cells.

TABLE 6

|  | Capacity (mAh) | Energy density (Wh/l) |
|---|---|---|
| Example 3 | 342 | 10.6 |

After completion of the above measurement, the positive electrodes and the negative electrodes were short-circuited and the potential of the positive electrode was measured, whereupon it was 1.1 V, which was at most 2.0 V. A capacitor having a high energy density was obtained by preliminarily supporting lithium ions by the negative electrodes and/or the positive electrodes so that the positive electrode potential would be at most 2.0 V when the positive electrodes and the negative electrodes were short-circuited, but the energy density was low as compared with Examples 1 and 2 and Comparative Example 1 and 2.

Even in a case where a copper foil was used for the current collector of the lithium electrode and lithium metal was pressure bonded on one side, a process of preparing two electrode units and disposing the lithium electrode between the units could be easily conducted, but no predetermined capacity (the same level as in Example 2) could be obtained. After completion of measurement, the cell was decomposed in an argon box and capacities of the two units were separately measured. As a result, the capacity of the electrode unit which faced the side having lithium metal pressure bonded thereon of the lithium electrode disposed at the center was high, whereas the capacity of the other electrode laminate unit was low. This is considered to be because a copper foil having no pores penetrating from the front surface to the back surface was used as the current collector of the lithium electrode at the center, whereby lithium ions in a predetermined amount (400 mAh/g) or above to obtain a capacitance of 660 F/g were supported by the negative electrodes of the electrode unit which faced the side having lithium metal pressure bonded thereon, whereas no lithium ions in a predetermined amount (400 mAh/g) to obtain a capacitance of 660 F/g were supported by the negative electrodes of the other electrode unit.

Comparative Example 3

Four cells of film type capacitors were assembled in the same manner as in Example 1 except that no lithium electrode was disposed in each cell (lithium ions were not preliminarily supported by the negative electrodes).

To measure the capacity using one cell, charge was carried out in the same manner as in Example 1 at a constant current of 4,000 mA until the cell voltage became 3.6 V, but gas was generated and the capacity could not be measured. Using the other three cells, a constant current/constant voltage charge was carried out for one hour, comprising charge at a constant current of 4,000 mA until the cell voltage became 2.8 V, and then applying a constant voltage of 2.8 V. Then, discharge was carried out at a constant current of 400 mA until the cell voltage became 1.4 V. This cycle of from 2.8 V to 1.4 V was repeatedly carried out, and the cell capacity and the cell density were evaluated at the third discharge. The results are shown in Table 7. The dada are averages of three cells.

TABLE 7

|  | Capacity (mAh) | Energy density (Wh/l) |
|---|---|---|
| Comparative Example 3 | 104 | 2.5 |

After completion of the above measurement, the positive electrodes and the negative electrodes were short-circuited and the potential of the positive electrode was measured, whereupon it was 3.5 V. No capacitor having a high energy density will be obtained unless lithium ions are preliminarily supported by the negative electrodes and/or the positive electrodes to a certain extent so that the positive electrode potential will be 2.0 V when the positive electrodes and the negative electrodes are short-circuited.

INDUSTRIAL APPLICABILITY

The lithium ion capacitor of the present invention is very useful as a driving or auxiliary storage device for electronic automobiles, hybrid electronic automobiles, etc. Further, it is suitable as a driving storage device for electronic automobiles, motorized wheelchairs, etc., a storage device for various energy generation such as solar energy generation and wind power generation, a storage device for domestic electronic equipment, etc.

The entire disclosure of Japanese Patent Application No. 2005-104691 filed on Mar. 31, 2005 including specification, claims, drawings and summary is incorporated herein by reference in its entirety.

The invention claimed is:

1. A lithium ion capacitor comprising a positive electrode, a negative electrode and an aprotic organic solvent solution of a lithium salt as an electrolytic solution, wherein a positive electrode active material is a material capable of reversibly supporting lithium ions and/or anions, a negative electrode active material is a material capable of reversibly supporting lithium ions, and the potential of the positive electrode is at most 2.0 V after the positive electrode and the negative electrode are short-circuited, characterized in that each of a positive electrode current collector and a negative electrode current collector has pores penetrating from the front surface to the back surface, the positive electrode and the negative electrode are alternately laminated with a separator interposed therebetween to constitute an electrode unit, the cell is constituted by at least two such electrode units, a lithium ion supply source is disposed between the electrode units, and lithium ions are preliminarily supported by the negative electrode and/or the positive electrode by electrochemical contact of the lithium ion supply source with the negative electrode and/or the positive electrode.

2. The lithium ion capacitor according to claim 1, wherein a lithium ion supply source is further provided on the outside of one or both of the electrode units at the end of the cell.

3. The lithium ion capacitor according to claim 1, wherein a current collector of the lithium ion supply source has pores penetrating from the front surface to the back surface.

4. The lithium ion capacitor according to claim 1, wherein the lithium ion supply source is formed in such a manner that the lithium ion supply source is pressure bonded on one side or both sides of the current collector.

5. The lithium ion capacitor according to claim 1, wherein the outermost portion of the electrode unit is a separator, and the inside thereof is the negative electrode.

6. The lithium ion capacitor according to claim 1, wherein the positive electrode active material is any one of (a) an activated carbon, (b) an electrically conductive polymer and (c) a polyacenic organic semiconductor (PAS) which is a heat-treated aromatic condensed polymer having a polyacenic skeleton structure with an atomic ratio of hydrogen atoms/carbon atoms between 0.50 and 0.05.

7. The lithium ion capacitor according to claim 1, wherein the negative electrode active material is any one of (a) graphite, (b) hardly graphitizable carbon and (c) a polyacenic organic semiconductor (PAS) which is a heat-treated aromatic condensed polymer having a polyacenic skeleton structure with an atomic ratio of hydrogen atoms/carbon atoms between 0.50 and 0.05.

8. The lithium ion capacitor according to claim 1, wherein the outside of the electrode units is fixed with a tape.

9. The lithium ion capacitor according to claim 1, wherein the negative electrode active material has a capacitance per unit weight at least three times that of the positive electrode active material, and the weight of the positive electrode active material is larger than the weight of the negative electrode active material.

* * * * *